June 17, 1969     T. MATTINSON     3,449,829
BUTTER SPREADER
Filed Dec. 18, 1967
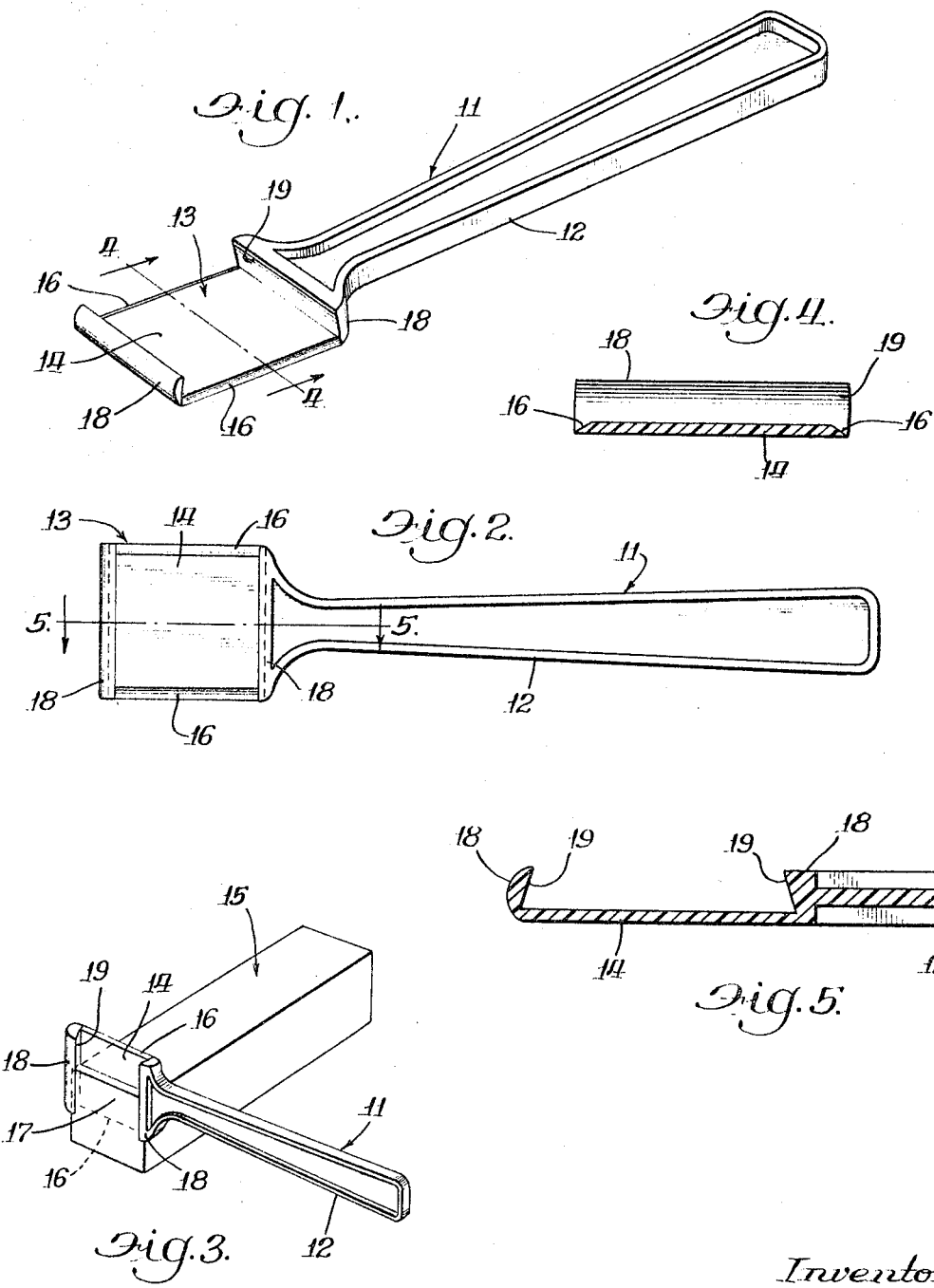
Inventor:
Thomas Mattinson
By Horton, Davis, Brewer & Brugman
Attys.

3,449,829
BUTTER SPREADER
Thomas Mattinson, 302 N. Maple St.,
Wood Dale, Ill. 60191
Filed Dec. 18, 1967, Ser. No. 691,560
Int. Cl. A47g 21/06; A47j 43/28
U.S. Cl. 30—124   2 Claims

ABSTRACT OF THE DISCLOSURE

Plastic device comprising unitary handle and head portions, latter defining rectangular blade with a base of substantially the same width as a standard quarter pound stick of butter or margarine, chamfered side cutting edges, and parallel end flanges having inner opposed plane surfaces converging outwardly from the base to facilitate neat removal of selectable end portion from stick while compressively engaging the severed end portion to insure retention thereof on the blade for spreading same on corn on the cob.

BACKGROUND OF THE INVENTION

This invention relates to butter spreaders, and particularly to an inexpensive device for neatly cutting a selected end portion from a quarter pound stick of butter or margarine and retaining such severed end portion on the device for spreading the same on or applying it directly to hot corn on the cob.

Patent No. 3,031,712 discloses a butter spreader intended for this purpose, but that device is spoon-shaped with rolled edges which is incapable of severing an end portion from a stick of butter neatly, leaving an irregular and messy stick end, and requires transversely extending ribs on the inner surface of its spoon-like base to retain any butter thereon.

SUMMARY OF THE INVENTION

A unitary device for spreading butter or margarine on hot corn on the cob, comprising a handle, and a head portion which defines a blade having a base of a length substantially the same as the width of a standard quarter pound stick of butter or margarine, with chamfered side edges to facilitate neat removal by cutting of a selectable end portion from such quarter pound stick, and parallel end flanges with inner opposed plane surfaces converging toward each other outwardly from the base to compressively engage such removed end portion of butter or margarine to insure retention thereof on the blade while applying the same to corn on the cob, or the like.

DESCRIPTION OF THE PREFERRED EMBODIMENT

In the drawings:

FIGURE 1 is a perspective view of a butter spreader embodying my invention;

FIG. 2 is a top plan view thereof;

FIG. 3 is a perspective view on a reduced scale showing the device of FIGS. 1 and 2 in a position of use during removal thereby of an end portion from a stick of butter or margarine; and FIGS. 4 and 5 are detail vertical sections on an enlarged scale taken substantially on the lines 4—4 of FIG. 1, and 5—5 of FIG. 2, respectively.

Referring more particularly to the drawings, reference numeral 11 indicates in general a butter spreader embodying the features of my invention comprising a handle portion 12 of any suitable and convenient shape and a rectangular head portion generally indicated at 13 and preferably formed integrally therewith. Any desired material may be employed for making this device, but it is preferred that the same be molded or formed as an integral casting from a suitable plastic.

The head portion 13 comprises a base 14 forming a preferably relatively thin blade having a length (in the direction of the longitudinal center line of the handle 12) substantially the same as the width of a standard quarter pound stick of butter or margarine, such as that designated generally by reference numeral 15 in FIG. 3. This length is a critical dimension of the base or blade 14, while the width of the blade is not critical, it being shown in the illustrated embodiment as somewhat greater than the length. As seen in FIGS. 1, 2 and 4, each side of the blade 14 is chamfered to provide a longitudinally extending cutting edge 16 to facilitate neat removal of an end portion 17 of selectable thickness from an end of the butter or margarine stick 15.

The blade or head portion 13 also includes a pair of parallel end flanges 18 defining inner, opposed plane surfaces 19 converging toward each other outwardly from the base or blade 14, as best seen in FIG. 5. Thus, as the device 11 is employed to cut an end portion 17 from a stick 15 of butter or margarine by addressing the blade 14 substantially vertically in a position normal to the longitudinal axis of a horizontally disposed stick 15 above the stick with the then lower cutting edge 16 coextensive therewith a selected distance from its end, and then moving the blade downwardly while maintaining the end flanges 18 aligned with the sides of the stick, as illustrated in FIG. 3, the vertically disposed marginal parts of the end portion 17 will be compressed somewhat or compressively engaged by the opposed converging surfaces 19. This insures retention of the end portion 17 on the blade 14 after it is severed or removed from the stick 15 and while applying the same in a spreading action to hot corn on the cob. It will be appreciated that the only change in conformation or application of compressive forces effected by the device 11 is to the end portion 17 being removed from the stick 15, so that a clean and neat removal thereof is accomplished without leaving a messy terminal portion on the remainder of the stick. The chamfered edges 16 also assist in obtaining such results by facilitating the cutting action during severing of an end portion 17 of any desired thickness.

It is thought that the invention and many of its attendant advantages will be understood from the foregoing description, and it will be apparent that various changes many be made in the form, construction, and arrangement of the parts without departing from the spirit and scope of the invention or sacrificing all of its material advantages, the form hereinbefore described and shown in the drawings being merely a preferred embodiment thereof.

I claim:

1. A butter spreader, comprising a handle portion, and a rectangular head portion at one end thereof forming a blade having a base of a length substantially the same as the width of a standard quarter pound stick of butter and parallel end flanges with inner opposed plane surfaces converging toward each other outwardly from said base, said blade being provided with chamfered side edges to facilitate neat removal by cutting of a selectable end portion from a quarter pound stick of butter, said converging plane surfaces of said end flanges thereby compressively engaging such removed end portion of butter to insure retention thereof on said blade while applying the same to corn on the cob.

2. Butter spreader according to claim 1, wherein said handle and head portions are formed as a unitary plastic device.

References Cited

UNITED STATES PATENTS

| 1,196,526 | 8/1916 | Danner | 30—124 |
| 1,263,780 | 4/1918 | Lieb. | |
| 1,426,085 | 8/1922 | Kohn | 30—124 |
| 1,494,018 | 5/1924 | Randolph | 30—124 |
| 2,814,868 | 12/1957 | Wellinger | 30—124 |
| 3,031,712 | 5/1962 | Wilson | 401—12 |

FOREIGN PATENTS 82,298   8/1953   Norway.

MORRIS KAPLAN, *Primary Examiner.*

U.S. Cl. X.R.

401—12